United States Patent [19]

Takamisawa et al.

[11] Patent Number: 5,337,317
[45] Date of Patent: Aug. 9, 1994

[54] MINIMIZING THE PROGRAMMING TIME IN A SEMICONDUCTOR INTEGRATED MEMORY CIRCUIT HAVING AN ERROR CORRECTION FUNCTION

[75] Inventors: Katsura Takamisawa; Yukihiro Nishiguchi, both of Kanagawa, Japan

[73] Assignee: NEC Corporation, Tokyo, Japan

[21] Appl. No.: 771,001

[22] Filed: Oct. 1, 1991

[30] Foreign Application Priority Data

Oct. 1, 1990 [JP] Japan ................................. 2-264407

[51] Int. Cl.$^5$ ..................... H03M 13/00; G06F 11/10
[52] U.S. Cl. ................................... 371/40.4; 371/51.1
[58] Field of Search ................. 371/40.4, 37.1, 37.4, 371/51.1, 49.2, 49.1, 40.1

[56] References Cited

U.S. PATENT DOCUMENTS

| | | | |
|---|---|---|---|
| 4,295,219 | 10/1981 | Draper et al. | 371/51 |
| 4,334,309 | 6/1982 | Bannon et al. | 371/38 |
| 4,612,640 | 9/1986 | Mehrotra et al. | 371/51 |
| 4,646,304 | 2/1987 | Fossati et al. | 371/38 |
| 4,730,320 | 3/1988 | Hidaka et al. | 371/38 |
| 4,901,320 | 2/1990 | Sawada et al. | 371/51.1 |
| 5,012,472 | 4/1991 | Arimoto et al. | 371/40.1 |
| 5,056,089 | 10/1991 | Furuta et al. | 371/3 |
| 5,056,095 | 10/1991 | Horiguchi et al. | 371/40.1 |
| 5,117,428 | 5/1992 | Jeppesen, III et al. | 371/51.1 |

*Primary Examiner*—Robert W. Beausoliel, Jr.
*Assistant Examiner*—Joseph E. Palys
*Attorney, Agent, or Firm*—Whitham, Curtis & Whitham

[57] ABSTRACT

A semiconductor integrated memory circuit includes therein a PROM having a plurality of bit cell groups, each of which includes a set of data bit cells for storing data and a set of check bit cells for storing a set of check bits corresponding to a content of the set of data bit cells for correction of error in the data stored in the set of data bit cells. A check bit input circuit is provided which can ensure that, when data to be programmed into a selected set of data bit cells is the same as a data erased condition of the PROM, a set of check bits having the same value as the data erased condition are held in a corresponding set of check bit cells. Therefore, it is possible to omit the writing of that data and a corresponding check bit set into a set of data bit cells and a corresponding set of check bit cells of the PROM, which are address-designated by a given address. An error correction circuit reads a set of data bits and a set of check bits from one set of data bit cells and one set of check bit cells in accordance with a given address for correcting an error on the basis of the read-out set of data bit cells and the read-out set of check bit cells, if an error exists.

5 Claims, 3 Drawing Sheets

MINIMIZING THE PROGRAMMING TIME IN A SEMICONDUCTOR INTEGRATED MEMORY CIRCUIT HAVING AN ERROR CORRECTION FUNCTION

BACKGROUND OF THE INVENTION

1. Field of the Invention

The present invention relates to a semiconductor integrated circuit, and more specifically to a semiconductor integrated memory circuit including therein a programmable read only memory (abbreviated "PROM") and having an error correction function.

2. Description of Related Art

In a conventional semiconductor integrated memory circuit including a PROM therein and having art error correction function, when a data bit set composed of a plurality of data bits is written or programmed into a data bit cell set of the PROM, a plurality of check bits are calculated on the basis of the plurality of data bits, and is written into a check bit cell set of the PROM. On the other hand, when data is read out from the PROM, corresponding check bits are also read out from the PROM. A logical processing is performed on the basis of data bits of the read-out data and the read-out check bits, so that if there is an error in the read-out data, the error is corrected.

In the above mentioned conventional semiconductor integrated memory circuit including a PROM therein and having an error correction function, in the case that data is not programmed, each data bit of the PROM is in an erased condition, namely, "1". Therefore, if all bits of a data bit set to be programmed are "1", it is not necessary to program that data bit set. On the other hand, all bits of a check bit set generated on the basis of the data bit set having all bits of "1" become "0" in the conventional semiconductor integrated memory circuit. Therefore, it is necessary to program "0" into a corresponding check bit cell set of the PROM.

Therefore, in the conventional semiconductor integrated memory circuit including a PROM therein and having an error correction function, although a program or data to be programmed includes a number of data bit sets to be written having all bits of "1", since it is necessary to program the check bits, a required total programming time has been long.

SUMMARY OF THE INVENTION

Accordingly, it is an object of the present invention to provide a semiconductor integrated memory circuit having an error correction function, which has overcome the above mentioned defect of the conventional one.

Another object of the present invention is to provide a semiconductor integrated memory circuit including a PROM therein and having an error correction function, which does not require a programming of a data bit set to be written if all bits of the data bit set are of "1", so that a required total time for programing can be shortened.

Still another object of the present invention is to provide a semiconductor integrated memory circuit including a PROM therein and having an error correction means permitting that if all bits of a data bit set to be programmed are in the same condition as an erased condition, all bits of a corresponding check bit set also are in the same condition as the erased condition, and that when a data bit set which should be composed of only bits in the same condition as the erased condition is read, an error correction can be performed without fail on the basis of all bits of the read-out data bit set and all bits of a corresponding check bit set which are in the same condition as the erased condition, The above and other objects of the present invention are achieved in accordance with the present invention by a semiconductor integrated memory circuit which has a correction function, comprising:

an address input means for supplying an address;

a programmable read only memory having a plurality of memory locations, each of which includes a set of data bit cells for storing data and a set of check bit cells for storing a set of check bits for correction of errors in the data stored in the set of data bit cells;

a check bit generating means receiving data to be programmed into a selected set of data bit cells in the programmable read only memory designated by an address supplied from the address input means, for generating a set of check bits on the basis of a set of data bits including the data to be programmed and writing the generated set of check bits to a set of check bit cells corresponding to the selected set of data bit cells, the check bit generating means being configured to be able to generate, when all bits of data to be programmed are the same as a data erased condition of the programmable read only memory, a set of check bits having the same value as the data erased condition; and an error correction means for reading a set of data bits and a set of check bits from one set of data bit cells and one set of check bit cells in accordance with an address designated by the address input means, for correcting an error on the basis of the read-out set of data bit cells and the read-out set of check bit cells, if an error exists.

According to another aspect of the present invention, there is provided a semiconductor integrated memory circuit which has a correction function, the semiconductor integrated memory circuit comprising:

an address input means for supplying an address;

a memory having a plurality of bit cell groups, each of which includes a set of data bit cells address-designated through the address input means for storing data supplied from an external device and a set of check bit cells address-designated through the address input means for storing a set of check bits corresponding to a content of the set of data bit cells for correction of error in the data stored in the set of data bit cells;

a check bit input means for programming, when data is programmed into a selected set of data bit cells, a set of check bits into a corresponding set of check bit cells;

said memory being configured so that when all bits of data to be programmed into a selected set of data bit cells is the same as a data erased condition of the programmable read only memory, a corresponding set of check bit cells should hold a set of check bits which has the same value as the data erased condition, and an error correction means for reading a set of data bits and a set of check bits from one set of data bit cells and one set of check bit cells in accordance with an address designated by the address input means, for correcting an error on the basis of the read-out set of data bit cells and the read-out set of check bit cells, if exists an error.

The above and other objects, features and advantages of the present invention will be apparent from the following description of preferred embodiments of the invention with reference to the accompanying drawings.

DESCRIPTION OF THE PREFERRED EMBODIMENTS

Figure 1:
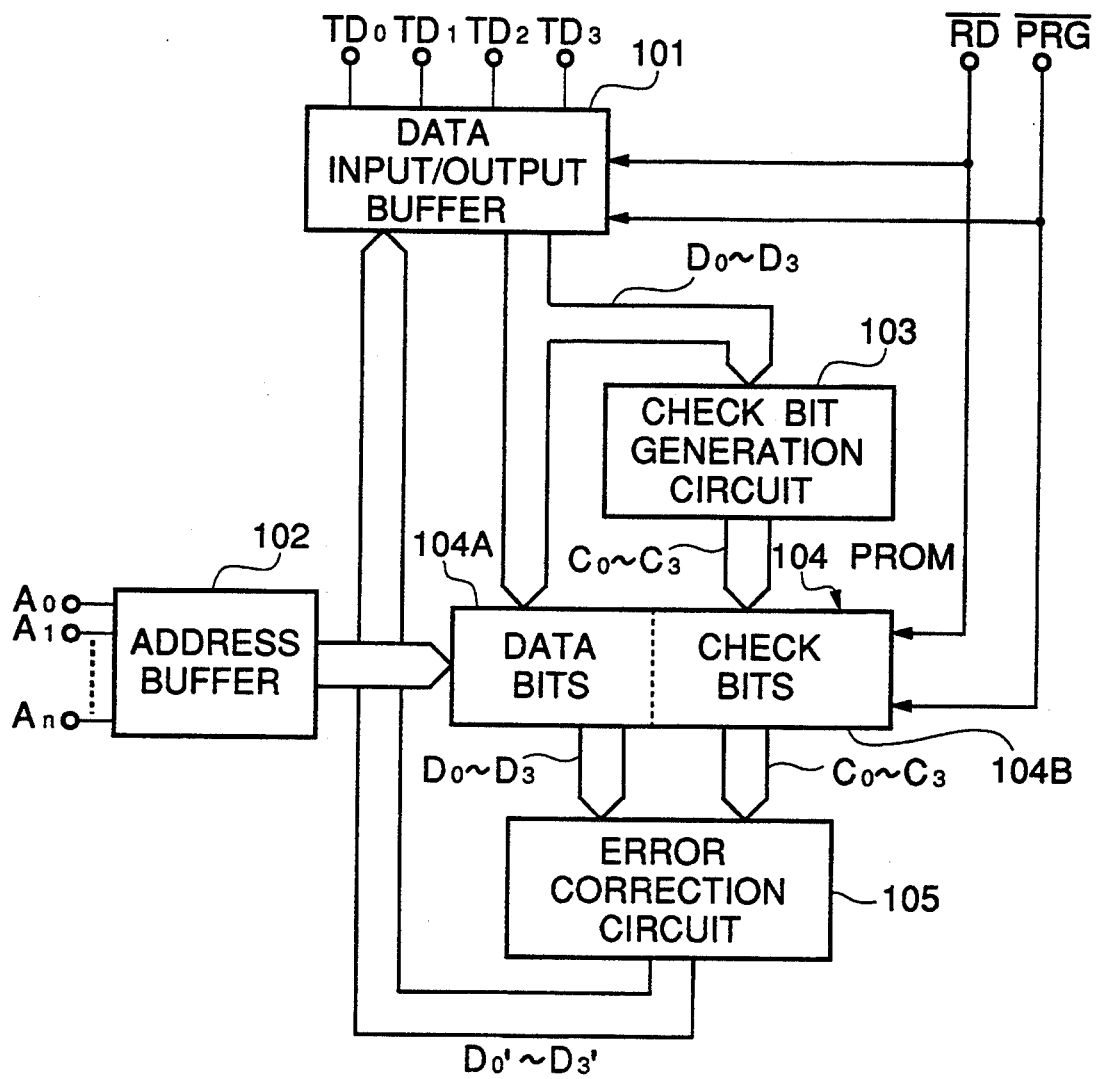
FIG. 1 is a block diagram of a first embodiment of the semiconductor integrated memory circuit in accordance with the present invention.

Referring to FIG. 1, there is shown a block diagram of a first embodiment of the semiconductor integrated memory circuit in accordance with the present invention.

The shown semiconductor integrated memory circuit includes an address buffer 102 having address terminals $A_0$ to $A_n$ for receiving an address, and coupled to a PROM 104 so as to supply the received address to the PROM 104. The PROM 104 also receives a read signal $\overline{RD}$ instructing a data reading of the PROM when it is active (namely "0"), and a program signal $\overline{PRG}$ instructing a data writing of the PROM when it is active (namely "0").

A data input/output buffer 101 is connected to data input/output terminals $TD_0$ to $TD_3$, and coupled to a data bit section 104A of the PROM 104 and a check bit generation circuit 103 so that four data bits $D_0$ to $D_3$ are supplied to the data bit section 104A of the PROM 104 and the check bit generation circuit 103, respectively. The check bit generation circuit 103 generates a set of check bits $C_0$ to $C_3$ to a check bit section 104B of the PROM 104. The data bit section 104A and the check bit section 104B of the PROM 104 are coupled to an error correction circuit 105, so that the error correction circuit 105 receives a read-out data bit set $D_0$ to $D_3$ and a read-out check bit set $C_0$ to $C_3$ and generates a corrected data bit set $D_0'$ to $D_3'$ to the data input/output buffer 101. The data input/output buffer 101 is connected to receive the read signal $\overline{RD}$ and the program signal $\overline{PRG}$, so that when the read signal $\overline{RD}$ is "0" (active), the data input/output buffer 101 acts as an output buffer and when the program signal $\overline{PRG}$ is "0" (active).

Address signals are supplied from the address terminals $A_0$ to $A_n$ through the address buffer 102 to the PROM 104, so that an address to be programmed or read is designated. The program signal $\overline{PRG}$ is brought to "0" (active), and four data bits $D_0$ to $D_3$ are inputted through the data input/output terminal $TD_0$ to $TD_3$ to the data input/output buffer 101, so that the four data bits $D_0$ to $D_3$ are inputted to the data bit section 104A of the PROM 104 and the check bit generation circuit 103. Therefore, four check bits $C_0$ to $C_3$ are generated by the check bit generation circuit 103 and written into the check bit section 104B of the PROM 104. Thus, the number of bits in memory locations of the PROM 104 designated by the address supplied through the external address terminals $A_0$ to $A_n$ is 8.

When the read signal $\overline{RD}$ is "0" (active), eight bits of the memory location in the PROM 104 designated by the address supplied through the external address terminals $A_0$ to $A_n$ are read out, and inputted to the error correction circuit 105. If an error of one bit occurs or is included in the data read out of the PROM 104, the error correction circuit 105 generates a corrected data of data bits $D_0'$ to $D_3'$ on the basis of the four read-out data bits and the four read-out check bits. The corrected data of data bits $D_0'$ to $D_3'$ are outputted through the data input/output buffer 101 to the data input/output terminals $TD_0$ to $TD_3$.

Figure 2:
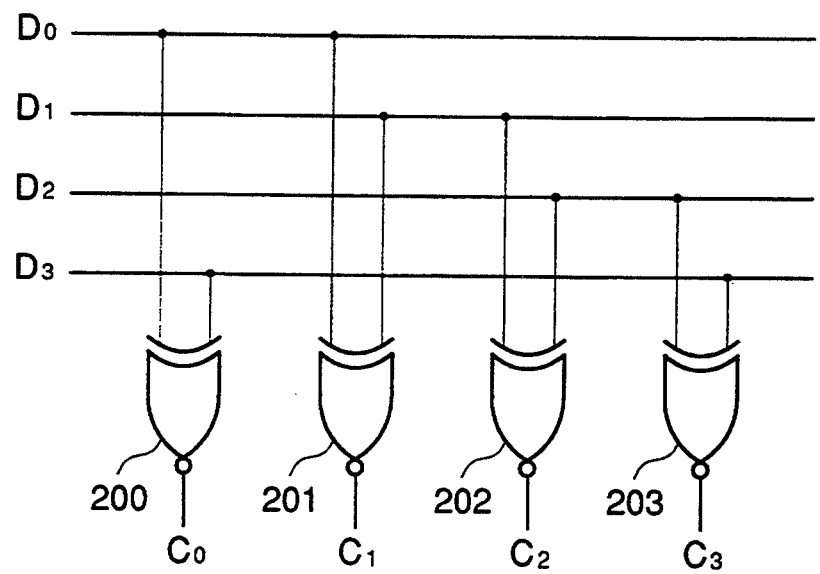
FIG. 2 is a logic circuit diagram of the check bit generation circuit incorporated in the semiconductor integrated memory circuit shown in FIG. 1.

Now, the check bit generation circuit 103 will be described with reference to FIG. 2. The check bit generation circuit 103 is configured to receive the four data bits $D_0$ to $D_3$ and to generate the four check bits $C_0$ to $C_3$ in accordance with the following logic equation:

$$\begin{aligned} C_0 &= D_0 \qquad\qquad\quad \oplus D_3 \\ C_1 &= D_0 \oplus D_1 \\ C_2 &= \qquad\quad D_1 \oplus D_2 \\ C_3 &= \qquad\qquad\quad D_2 \oplus D_3 \end{aligned}$$

In the above equation, the symbol $\oplus$ means an exclusive-OR.

For realizing the above mentioned logical operation, the check bit generation circuit 103 includes four exclusive-NOR gates 200 to 203 located in parallel and connected to receive a difference pair of data bits of the four data bits $D_0$ to $D_3$. The exclusive-NOR gate 200 has a pair of inputs connected to receive the data bits $D_0$ and $D_3$, and generates a check bit $C_0$, and the exclusive-NOR gate 201 has a pair of inputs-connected to receive the data bits $D_0$ and $D_1$, and generates a check bit $C_1$. The exclusive-NOR gate 202 has a pair of inputs connected to receive the data bits $D_1$ and $D_2$, and generates a check bit $C_2$, and the exclusive-NOR gate 203 has a pair of inputs connected to receive the data bits $D_2$ and $D_3$, and generates a check bit $C_3$.

As seen from the above, if all of the data bits $D_0$ to $D_3$, which constitutes one data set to be written into the PROM 104, are "1", all bits $C_0$ to $C_3$ of a corresponding check bit set also become "1".

Figure 3:
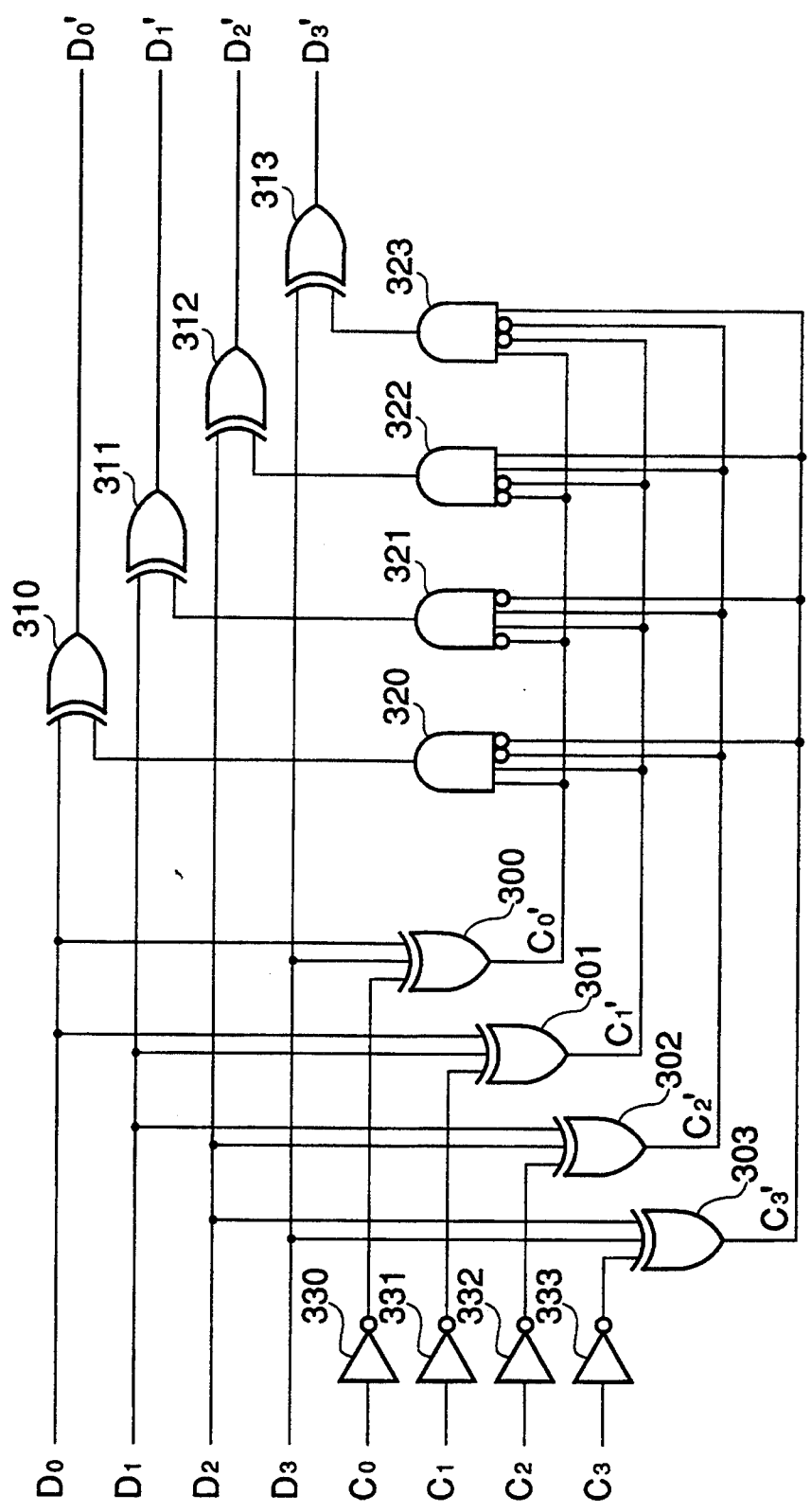
FIG. 3 is a logic circuit diagram of the error correction circuit incorporated in the semiconductor integrated memory circuit shown in FIG. 1.

Referring to FIG. 3, there is shown a logic diagram of the error correction circuit 105.

The error correction circuit 105 is configured to receive four data bits $D_0$ to $D_3$ read from the data bit section 104A of the PROM 104 and four check bits $C_0$ to $C_3$ read from the check bit section 104B of the PROM 104, and to generate a corrected data composed of corrected data bits $D_0'$ to $D_3'$ if an error of one bit occurs or is included in the four read-out data bits $D_0$ to $D_3$. If the four read-out data bits $D_0$ to $D_3$ have no error, the read-out data bits $D_0$ to $D_3$ are outputted without modification as the corrected data bits $D_0'$ to $D_3'$.

Therefore, the read-out data bits $D_0$ to $D_3$ are connected to one input of four two-input exclusive-OR gates 310 to 313, respectively, which generate the corrected data bits $D_0'$ to $D_3'$, respectively. Therefore, the exclusive-OR gates 310 to 313 operate to output the received read-out data bits $D_0$ to $D_3$ without modification as the corrected data bit $D_0'$ to $D_3'$, if each of the exclusive-OR gates 310 to 313 receives "0" at its other input.

On the other hand, the four check bits $C_0$ to $C_3$ read from the check bit section of the PROM 104 are inputted through four inverters 330 to 333 to four three-input exclusive-OR gates 300 to 303, respectively. Each of the exclusive-OR gates 300 to 303 receives at its remaining two inputs a different pair of data bits of the four data bits $D_0$ to $D_3$. Specifically, the exclusive-OR gate 300 has its remaining two inputs connected to receive the data bits $D_0$ and $D_3$, and generates an error bit $C_0'$, and the exclusive-OR gate 301 has its remaining two inputs connected to receive the data bits $D_0$ and $D_1$, and generates an error bit $C_1'$. The exclusive-OR gate 302 has its remaining two inputs connected to receive the data bits $D_1$ and $D_2$, and generates an error bit $C_2'$, and the exclusive-OR gate 303 has its remaining two inputs connected to receive the data bits $D_2$ and $D_3$, and generates an error bit $C_3'$. The following equation shows the relation between the data bits $D_0$ to $D_3$ and the error bits $C_0'$ to $C_3'$.

$$C_0' = D_0 \oplus D_3 \oplus C_0$$
$$C_1' = D_0 \oplus D_1 \oplus C_1$$
$$C_2' = D_1 \oplus D_2 \oplus C_2$$
$$C_3' = D_2 \oplus D_3 \oplus C_3$$

In addition, the following table shows the outputs $C_0'$ to $C_3'$ of the exclusive-OR gates 300 to 303 when each of the data bits $D_0$ to $D_3$ is an error bit.

|  |  | OUTPUT STATE OF EXCLUSIVE-OR | | | |
|---|---|---|---|---|---|
|  |  | EXOR 300 | EXOR 301 | EXOR 302 | EXOR 303 |
| ERROR | $D_0$ | 1 | 1 | 0 | 0 |
| GENERATION | $D_1$ | 0 | 1 | 1 | 0 |
| SIGNAL | $D_2$ | 0 | 0 | 1 | 1 |
|  | $D_3$ | 1 | 0 | 0 | 1 |

As seen from the above table, if the data bit $D_0$ is an error bit, the outputs $C_0'$ and $C_1'$ of the exclusive-OR gates 300 and 301 become "1" and the outputs $C_2'$ and $C_3'$ of the exclusive-OR gates 302 and 303 become "0".

The error bits $C_0'$ to $C_3'$ outputted from the exclusive-OR gates 300 to 303 are supplied into four decoders 320 to 323 each composed of a four-input AND gate. Each of the decoder 320 to 323 decodes the error bits $C_0'$ to $C_3'$ outputted from the exclusive-OR gates 300 to 303 so as to indicate whether or not a corresponding data bit is an error bit. For example, the four-input AND gate 320 receives the error bits $C_0'$ and $C_1'$ outputted from the exclusive-OR gates 300 and 301 and an inverted bit of the error bits $C_2'$ and $C_3'$ outputted from the exclusive-OR gates 302 and 303. Similarly, the other AND gates 321 to 323 receive the error bits $C_0'$ to $C_3'$ outputted from the exclusive-OR gates 300 to 303, two bits selected in accordance with the above table in a non-inverted form and the remaining two bits in an inverted form. In addition, outputs of the AND gates 320 to 323 are supplied to the other input of the exclusive-OR gates 310 to 313, respectively.

Accordingly, when an error occurs in the data bit $D_0$, the outputs $C_0'$ to $C_3'$ of the exclusive-OR gates 300 to 303 become "1100", and the AND gate 320 outputs an active signal, namely, a signal of "1". Therefore, it can be known that the active output of the AND gate 320 means that an error occurs in the data bit $D_0$. The output "1" of the AND gate 320 is supplied to the exclusive-OR gate 310, so that the data bit $D_0$ is inverted by the exclusive-OR gate 310, and a corrected data bit $D_0'$ can be obtained from the exclusive-OR gate 310.

In the above mentioned first embodiment, if all bits of a data bit set to be written are "1" which is the same condition as an erased condition, all bits of a corresponding check bit set to be written also become "1" which is the same condition as the erased condition. Therefore, if all bits of a data bit set to be written are in the same condition as an erased condition, it becomes possible to omit the programming of the data bit set and the associated check bit set, all of whose bits are the same condition as an erased condition. Accordingly, the total required time for programming can be shortened. On the other hand, when a data bit set which should be composed of only bits in the same condition as the erased condition is read, an error correction can be performed without fail on the basis of all bits of the read-out data set and all bits of a corresponding check bit set which are in the same condition as the erased condition.

Figure 4:
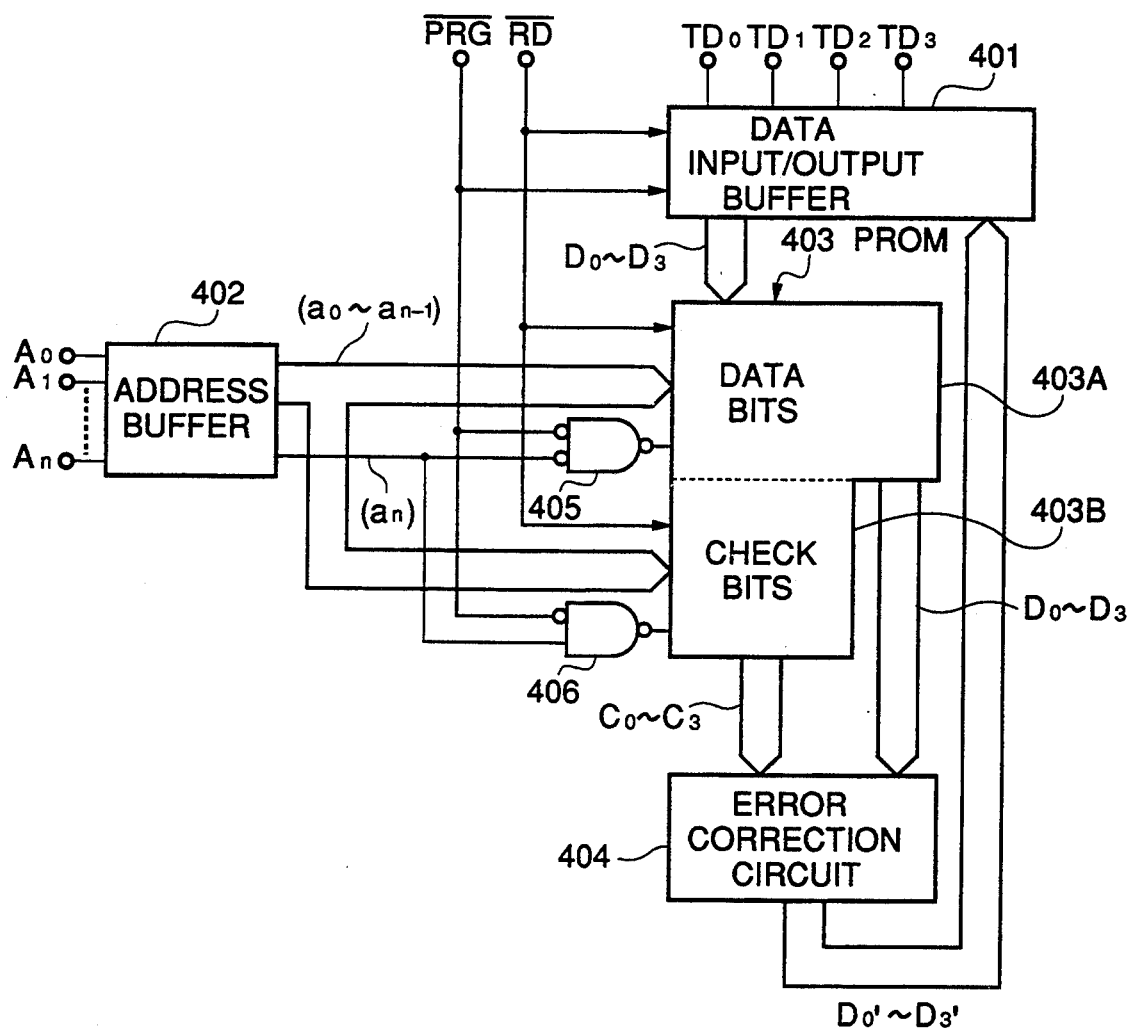
FIG. 4 is a block diagram of a second embodiment of the semiconductor integrated memory circuit in accordance with the present invention.

Referring to FIG. 4, there is shown a second embodiment of the semiconductor integrated memory circuit. The second embodiment includes a data input/output buffer 401, an address buffer 402, a PROM 403, and an error correction circuit 404.

As seen from comparison between FIGS. 1 and 4, the second embodiment does not include the check bit generation circuit 103. Instead of the omitted check bit generation circuit 103, the second embodiment is configured to receive through the data input/output buffer 401 a check bit set generated in an external device, so that the check bit set generated in an external device is programmed into a check bit section 403B of the PROM 403.

In the PROM 403, a data bit section 403A has an address different from that of the check bit section 403B. Specifically, a check bit set stored at a memory location designated by an address obtained by inverting the most significant bit of an address given for a data bit set constitutes the check bit set for the data bit set stored at a memory location designated by the given address.

In view of this arrangement, address signals $a_0$ to $a_{n-1}$ supplied to external address terminals $A_0$ to $A_{n-1}$ of the external address terminals $A_0$ to $A_n$ are supplied through the address buffer 402 directly to the data bit section 403A and the check bit section 403B of the PROM 403. The program signal $\overline{PRG}$ is supplied together with the remaining address signal $a_n$ to an OR gate 405, which has an output connected to the data bit section 403A of the PROM 403. In addition, the program signal $\overline{PRG}$ and the remaining address signal $a_n$ are connected to an inverted input and a non-inverted input of an NAND gate 406, respectively, an output of which is inputted to the check bit section 403B of the PROM 403.

The read signal $\overline{RD}$ is supplied directly to both of the data bit section 403A and the check bit section 404B of the PROM 403. The program signal $\overline{PRG}$ is supplied to the data input/output buffer 401, which acts as an input buffer when the program signal $\overline{PRG}$ is active, so that data signals $D_0$ to $D_3$ inputted from the data input/output terminals $TD_0$ to $TD_3$ are supplied to the PROM 403. The read signal $\overline{RD}$ is also supplied to the data input/output buffer 401 which acts as an output buffer when the read signal $\overline{RD}$ is active, so that corrected data signals $D_0'$ to $D_3'$ outputted from the error correction circuit 404 are outputted from the data input/output terminals $TD_0$ to $TD_3$.

In the second embodiment, the input and output of the data is executed similarly to the first embodiment. However, the programming method and the reading method of the check bit section and the data bit section are different.

When the program signal $\overline{PRG}$ is active ("0") and the address signal "$a_n$" is "0", the output of the OR gate 405 is rendered active ("0"), and the data bits $D_0$ to $D_3$ inputted to the data input/output terminals $TD_0$ to $TD_3$ are written or programmed into a data bit cell set (memory location) in the data bit section 403A of the PROM 403 designated by the address signals $a_0$ to $a_{n-1}$.

On the other hand, when the program signal $\overline{PRG}$ is active ("0") and the address signal "$a_n$" is "1", the output of the NAND gate 406 is rendered active ("0"), the data bits $D_0$ to $D_3$ inputted to the data input/output terminals $TD_0$ to $TD_3$ are written or programmed into a check bit cell set (memory location) in the check bit section 403B of the PROM 403 designated by the address signals $a_0$ to $a_{n-1}$.

As seen from the above, in an address space defined by the address signals $a_0$ to $a_n$ supplied through the external address terminals $A_0$ to $A_n$, an address space having the most significant address bit $a_n$ of "0" is assigned to the data bit section 403A, and an address space having the most significant address bit $a_n$ of "1" is assigned to the check bit section 403B.

On the other hand, since the read signal $\overline{RD}$ is applied to both of the data bit section 403A and the check bit section 403B of the PROM as it is, when the read signal $\overline{RD}$ is active ("0"), the data bit set and the check bit set at memory locations designated by the address signals $a_0$ to $a_{n-1}$ supplied to the address terminals $A_0$ to $A_{n-1}$ are simultaneously read out and then supplied to the error correction circuit 404.

This error correction circuit 404 has the same construction as that of the error correction circuit 104 shown in FIG. 3. Therefore, the error correction circuit 404 outputs a correct data of data bits $D_0'$ to $D_3'$ through the data input/output buffer 401 to the data input/output terminals $TD_0$ and $TD_3$.

Therefore, in this second embodiment, where all bits of a data bit set to be written are "1", all bits of a corresponding check bit set to be written also become "1". Therefore, in this case, it is not necessary to program or write the data bit set and the associated check bit set into the PROM 403. On the other hand, when a data bit set which should be composed of only bits of "1" is read, an error correction can be performed without fail on the basis of all bits of the read-out data set and all bits of a corresponding check bit set composed of only bits of "1".

The invention has thus been shown and described with reference to the specific embodiments. However, it should be noted that the present invention is in no way limited to the details of the illustrated structures but changes and modifications may be made within the scope of the appended claims.

We claim:

1. A semiconductor integrated memory circuit which has a correction function, comprising:
an address input means for supplying an address;
a programmable read only memory having a plurality of memory locations, each of which includes a set of data bit cells for storing data and a set of check bit cells for storing a set of check bits for correction of errors in the data stored in said set of data bit cells;
a check bit generating means receiving data to be programmed into a selected set of data bit cells in said programmable read only memory designated by an address supplied from said address input means, for generating a set of check bits on the basis of a set of data bits including said data to be programmed and writing said generated set of check bits to a set of check bit cells corresponding to said selected set of data bit cells, said check bit generating means being configured to be able to generate, when all bits of data to be programmed are the same as a data erased condition of said programmable read only memory, a set of check bits having the same value as said data erased condition; and
an error correction means for reading a set of data bits and a set of check bits from one set of data bit cells and one set of check bit cells in accordance with an address designated by said address input means, for correcting an error on the basis of said read-out set of data bit cells and said read-out set of check bit cells, if an error exists,
wherein when all bits of data to be programmed are the same as a data erased condition of said programmable read only memory, omitting the writing of that data and a corresponding check bit set into a set of data bit cells and a corresponding set of check bit cells of said programmable read only memory, which are address-designated by a given address.

2. A semiconductor integrated memory circuit claimed in claim 1 wherein said check bit generating means includes a plurality of exclusive-NOR gates of the same number as the number of check bits included in each set of check bit cells, said exclusive-NOR gates being connected so receive a different pair of data bits included in a set of data bits, so that each of said exclusive-NOR gates generates one check bit for a corresponding set of check bits.

3. A semiconductor integrated memory circuit claimed in claim 2 wherein said error correction means is configured to invert said set of check bits read out from said one set of check bit cells designated in accordance with said address supplied by said address input means, and to correct an error on the basis of said read-out set of data bit cells and the inverted bits of said read-out set of check bit cells, if an error exists.

4. A semiconductor integrated memory circuit which has a correction function, the semiconductor integrated memory circuit comprising:
an address input means for supplying an address;
a programmable read only memory having a plurality of bit cell groups, each of which includes a set of data bit cells address-designated through said address input means for storing data supplied from an external device and a set of check bit cells address-designated through said address input means for storing a set of check bits corresponding to a content of said set of data bit cells for correction of error in the data stored in said set of data bit cells;
a check bit input means for programming, when data is programmed into a selected set of data bit cells, a set of check bits into a corresponding set of check bit cells;
said memory being configured so that when all bits of data to be programmed into a selected set of data bit cells is the same as a data erased condition of said programmable read only memory, a corresponding set of check bit cells should hold a set of check bits which has the same value as said data erased condition, and an error correction means for reading a set of data bits and a set of check bits from one set of data bit cells and one set of check bit cells in accordance with an address designated by said address input means, for correcting an error on the basis of said read-out set of data bit cells and said read-out set of check bit cells, if an error exists, wherein when all bits of data to be programmed are the same as a data erased condition of said programmable read only memory, omitting the writing of that data and a corresponding check bit set into a set of data bit cells and a corresponding set of check bit cells of said programmable read only memory, which are address-designated by a given address.

5. A semiconductor integrated memory circuit claimed in claim 4 wherein said error correction means is configured to invert said set of check bits read out form said one set of check bit cells designated in accordance with said address supplied by said address input means, for correcting an error on the basis of said read-out set of data bit cells and the inverted bits of said read-out set of check bit cells, if an error exists.

* * * * *